United States Patent
Kloper et al.

(10) Patent No.: US 8,666,319 B2
(45) Date of Patent: Mar. 4, 2014

(54) MITIGATING EFFECTS OF IDENTIFIED INTERFERENCE WITH ADAPTIVE CCA THRESHOLD

(75) Inventors: David Kloper, San Jose, CA (US); Douglas Chan, San Jose, CA (US); David Stiff, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 286 days.

(21) Appl. No.: 13/183,506

(22) Filed: Jul. 15, 2011

(65) Prior Publication Data

US 2013/0017794 A1    Jan. 17, 2013

(51) Int. Cl.
*H04B 1/00* (2006.01)
*H04B 15/00* (2006.01)

(52) U.S. Cl.
USPC ........................ 455/63.1; 455/67.11

(58) Field of Classification Search
USPC ................... 455/63.1, 67.11, 67.14
See application file for complete search history.

(56) References Cited

U.S. PATENT DOCUMENTS

| | | | |
|---|---|---|---|
| 6,611,231 B2 * | 8/2003 | Crilly, Jr. et al. | 342/378 |
| 6,714,605 B2 | 3/2004 | Sugar et al. | |
| 6,850,735 B2 | 2/2005 | Sugar et al. | |
| 6,941,110 B2 | 9/2005 | Kloper et al. | |
| 6,970,682 B2 * | 11/2005 | Crilly, Jr. et al. | 455/78 |
| 7,035,593 B2 | 4/2006 | Miller et al. | |
| 7,079,812 B2 | 7/2006 | Miller et al. | |
| 7,116,943 B2 | 10/2006 | Sugar et al. | |
| 7,171,161 B2 | 1/2007 | Miller | |
| 7,184,777 B2 | 2/2007 | Diener et al. | |
| 7,224,752 B2 | 5/2007 | Sugar et al. | |
| 7,254,191 B2 | 8/2007 | Sugar et al. | |
| 7,269,151 B2 | 9/2007 | Diener et al. | |
| 7,292,656 B2 | 11/2007 | Kloper et al. | |
| 7,408,907 B2 | 8/2008 | Diener | |
| 7,424,268 B2 | 9/2008 | Diener et al. | |
| 7,450,673 B2 | 11/2008 | Jin et al. | |
| 7,596,461 B2 | 9/2009 | Hart et al. | |
| 7,606,335 B2 | 10/2009 | Kloper et al. | |
| 7,623,494 B2 * | 11/2009 | Zhu et al. | 370/333 |
| 7,801,239 B2 | 9/2010 | Jin et al. | |
| 7,801,546 B2 * | 9/2010 | Yang et al. | 455/522 |
| 7,924,957 B2 | 4/2011 | Jin | |
| 8,050,627 B2 * | 11/2011 | Makhlouf et al. | 455/63.1 |
| 2002/0158801 A1 * | 10/2002 | Crilly, Jr. et al. | 342/378 |
| 2003/0020651 A1 * | 1/2003 | Crilly, Jr. et al. | 342/378 |
| 2005/0243059 A1 * | 11/2005 | Morris et al. | 345/158 |
| 2007/0060155 A1 * | 3/2007 | Kahana et al. | 455/450 |
| 2007/0133473 A1 * | 6/2007 | Takagi et al. | 370/334 |
| 2007/0270102 A1 * | 11/2007 | Zhu et al. | 455/69 |
| 2007/0286122 A1 * | 12/2007 | Fonseca | 370/329 |
| 2008/0008133 A1 * | 1/2008 | Zhu et al. | 370/332 |
| 2008/0039146 A1 | 2/2008 | Jin | |

(Continued)

*Primary Examiner* — Lewis West
(74) *Attorney, Agent, or Firm* — Edell, Shapiro & Finnan, LLC (57) ABSTRACT

Techniques are provided to adaptively adjust a clear channel assessment threshold for use when a wireless device is to transmit in a wireless network that operates on a channel in a radio frequency band. A first wireless device, configured to wirelessly communicate with one or more second wireless device in the wireless network, receives energy on the channel in the frequency band, analyzes the received energy to detect interference on the channel and determines a type of interference detected in the received energy. The clear channel assessment threshold is adjusted by an amount depending on the type of interference detected.

22 Claims, 5 Drawing Sheets

(56) References Cited

U.S. PATENT DOCUMENTS

| | | | |
|---|---|---|---|
| 2008/0125160 A1* | 5/2008 | Zhu | 455/522 |
| 2008/0146156 A1* | 6/2008 | Makhlouf et al. | 455/63.1 |
| 2009/0086843 A1* | 4/2009 | Li | 375/285 |
| 2011/0128895 A1* | 6/2011 | Sadek et al. | 370/280 |
| 2013/0012134 A1* | 1/2013 | Jin et al. | 455/62 |

* cited by examiner

MITIGATING EFFECTS OF IDENTIFIED INTERFERENCE WITH ADAPTIVE CCA THRESHOLD

TECHNICAL FIELD

The present disclosure relates to wireless communication networks.

BACKGROUND

An unlicensed frequency band is used for wireless communication of certain wireless communication networks, such as WiFi™ wireless local area networks that operate in the 2.4 GHz band in the United States. Interference mitigation in a wireless network that operates in an unlicensed frequency is important due to the limited bandwidth and coexistence issues.

WiFi devices employ the carrier sense multiple access (CSMA) protocol in order to detect energy on their channel and only transmit when the channel is not being used. In particular, if the energy detected is above a CCA threshold level, then the channel is deemed to be in-use and the transmission attempt is deferred. For example, in the IEEE 802.11n wireless local area network (WLAN) protocol, the CCA threshold for 20 MHz transmissions is −62 dBm.

Because a WiFi network operates in an unlicensed frequency band, there may be many wireless devices on a given channel that do not follow a "listen-before-talk" protocol. As a result, when these non-WiFi interferers are present, they make no effort to share the channel with WiFi devices. For instance, it is well known that a wireless camera can produce a transmission having a wide bandwidth at an unrestrained power level. As a result, the WiFi devices will always defer to the non-WiFi interferer's transmissions, which leads to a significant degradation of network throughput, perhaps even reducing throughput to zero in the presence of certain interferers.

DESCRIPTION OF EXAMPLE EMBODIMENTS

Overview

Techniques are provided to adaptively adjust a clear channel assessment threshold for use when a wireless device is to transmit in a wireless network that operates on a channel in a radio frequency band. A first wireless device, configured to wirelessly communicate with one or more second wireless device in the wireless network, receives energy on the channel in the frequency band, analyzes the received energy to detect interference on the channel and determines a type of interference detected in the received energy. The clear channel assessment threshold is adjusted by an amount depending on the type of interference detected.

Example Embodiments

Embodiments are provided herein for spectrum intelligence-enabled wireless local area networks (WLANs) to mitigate the detrimental effects of co-channel non-WLAN interferences by identifying them and accordingly adapting to a suitable clear channel assessment (CCA) threshold. The term "spectrum intelligence" refers to the capability of devices in a WLAN, e.g., access points, to analyze radio frequency (RF) signals in order to identify signals and sources of signals in a frequency band of interest.

A CCA threshold is a receive signal strength level that is used when a device is attempting to transmit on a channel using carrier sense multiple access (CSMA) techniques. Specifically, a device evaluates receive signal strength on the channel before initiating a transmission on the channel. If the receive signal strength on the channel is greater than the CCA threshold (indicating that another device may be transmitting on the channel or energy is otherwise present on the channel at that time), the device refrains from transmitting on the channel. Some period of time later, the device again evaluates receive signal strength on the channel and if the receive signal strength is less than the CCA threshold, the device can send its transmission on the channel. Thus, when the CCA threshold used by a device is lowered, the receive signal strength on the channel needs to be even lower in order for the device to initiate a transmission, making access to the channel for the device more restrictive, and conversely, when the CCA threshold is higher, the CCA threshold is less likely to be exceeded and therefore the device will have less restrictive access to the channel. Moreover, when the CCA threshold is raised, it may also result in possibly transmitting on the channel in the presence of signals from other devices, and such simultaneous use of the channel (coexistence) impacts the throughput on a wireless link because the interference between the two or more signals on the channel may result in a lower receive signal-to-noise ratio (SNR) and thus more errors and requests for packet retransmissions at the intended receiving device.

Figure 1:
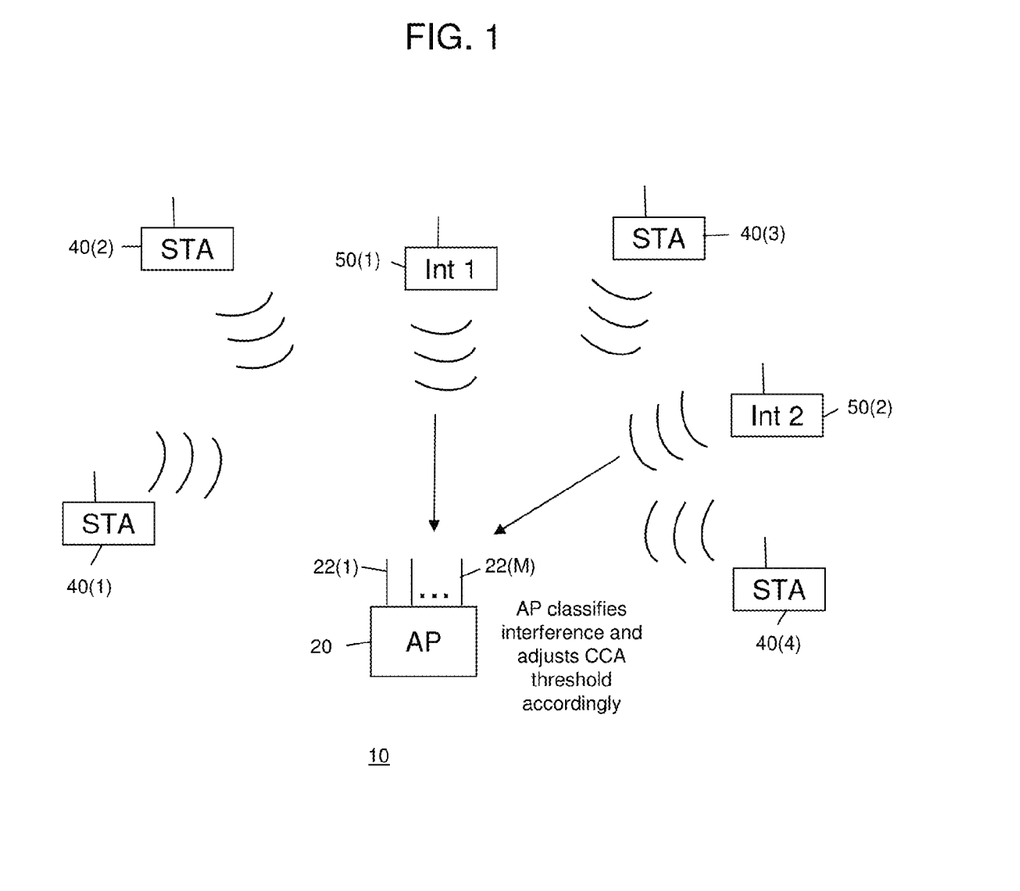
FIG. 1 is a diagram depicting an example of a wireless network operating in an unlicensed frequency band where interfering devices also operate, and in which a wireless access point is configured to adaptively adjust a clear channel assessment threshold based on the type(s) of detected interference.

Referring first to FIG. 1, a wireless communication network is shown generally at reference numeral 10, comprising a wireless access point (AP) 20 and a plurality of wireless stations (STAs) 40(1)-40(4). The AP may serve more than four STAs but for purposes of the examples described herein, FIG. 1 shows only four STAs. The AP 20 and STAs 40(1)-40(4) are configured to operate in accordance with a wireless network communication protocol or standard, such as the IEEE 802.11 WLAN communication protocol, also known as a WiFi™ network. Another term for a non-AP STA in IEEE 802.11 parlance is a wireless client device or simply a "client." In general, the AP 20 may be referred to as a "first wireless device" and the STAs 40(1)-40(4) referred to as "second wireless devices" that wirelessly communicate with first wireless device.

Since an IEEE 802.11 WLAN operates in an unlicensed frequency band, e.g., the 2.4 GHz band in the United States, there is a strong possibility that other devices that are configured to operate in the unlicensed frequency band may be active and interfere with the operation of the WLAN. To this end, FIG. 1 shows interference (Int) devices Int 1 at 50(1) and Int 2 at 50(2). Examples of such interference devices are those that operate with in accordance with the Bluetooth™ wireless communication protocol, such as Bluetooth wireless headsets, wireless video communication devices (e.g., wireless video cameras). Other devices that can generate interference in the 2.4 GHz unlicensed band are microwave ovens, wireless video cameras, certain digital wireless phones, etc. The devices that can generate interference in the unlicensed band may be operating via their own proprietary protocols, may not use a CSMA technique to determine when to transmit on a channel in a frequency band, and thus do not share the channel fairly with WLAN devices.

The AP generates spectrum intelligence information that indicates whether an interferer is present, the type of interferer detected, and the receive signal strength information (RSSI) of the interferer. Thus, the spectrum intelligence information may comprise but not limited to {interferer present, type of interferer, RSSI of interferer}.

Figure 2:
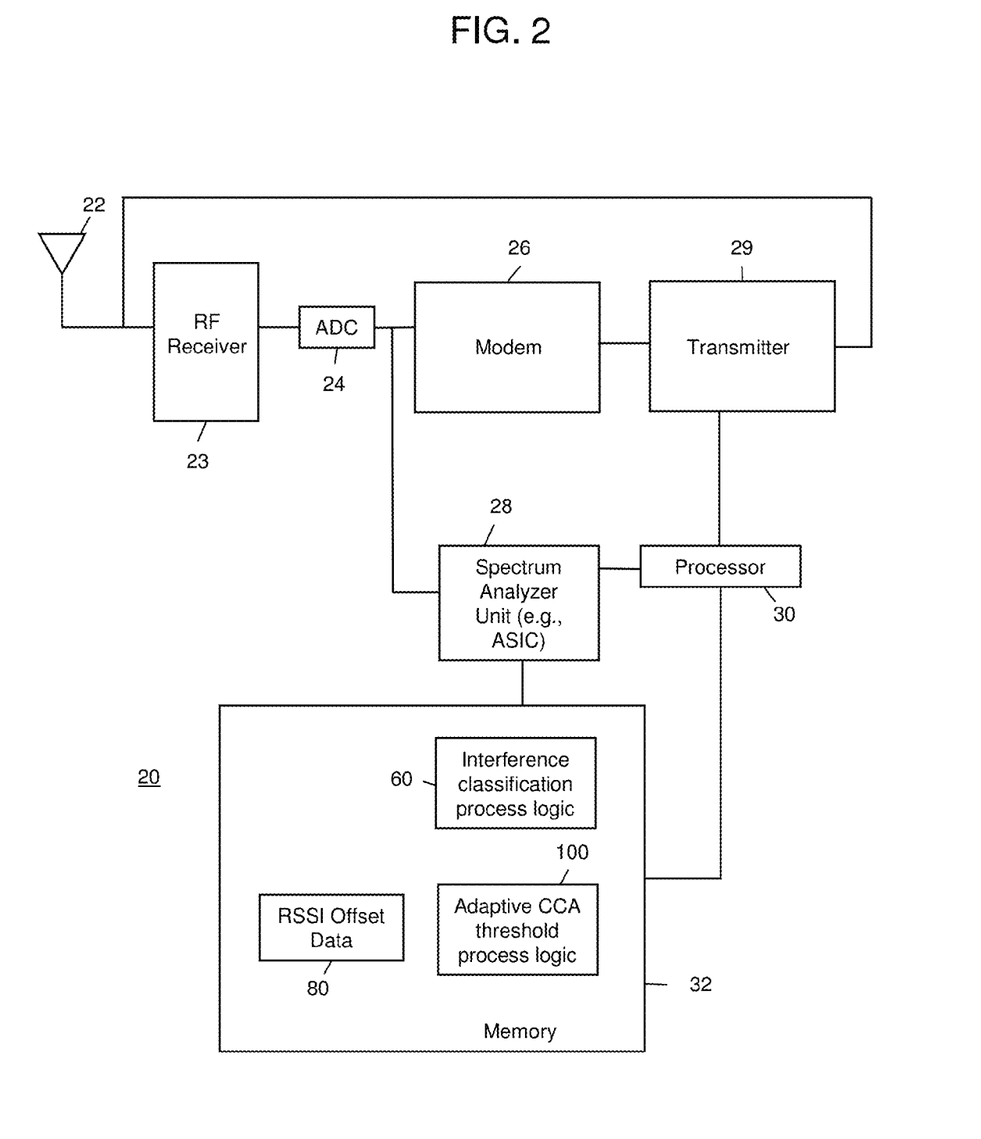
FIG. 2 is a block diagram showing an example of a wireless device, e.g., a wireless access point device, configured to adaptively adjust a clear channel assessment threshold based on the type(s) of detected interference.

Reference is now made to FIG. 2 for a description of a block diagram of AP 20 that is configured to perform the spectrum intelligence-guided adaptive CCA threshold techniques. The AP comprises at least one antenna 22, a radio frequency (RF) receiver 23, an analog-to-digital converter (ADC) 24, a modem 26, a spectrum analyzer unit 28, a transmitter 29, a processor 30 and memory 32. The RF receiver 23 comprises radio receiver circuitry to downconvert energy detected by the antenna 22. The circuitry in the RF receiver 23 is not germane to the spectrum intelligence-guided adaptive CCA threshold techniques and is therefore not shown and described in detail. The ADC 24 converts the downconverted analog signals from the antenna 22 to digital signals. The digital signals output by the ADC 24 are supplied to the modem 26 for baseband signal processing and to the spectrum analyzer unit 28. The transmitter 29 is configured to upconvert baseband transmit signals received from the modem 26 for transmission via the antenna 22. The transmit signals transmitted by transmitter 29 are sourced and controlled by the modem 26 and processor 30. The processor 30 is a microprocessor or microcontroller, for example.

The AP 20 may have multiple antennas and employ multiple-input multiple-output (MIMO) techniques, in which case there is an ADC associated with each receive (antenna) signal path. The modem 26 may be an off-the-shelf WiFi baseband receiver chip or chipset. For example, the modem 26 may be configured to process orthogonal frequency division multiplexed (OFDM) baseband signals according to the IEEE 802.11n standard, for example. In one form, the spectrum analyzer unit 28 may be implemented by digital logic gates in one or more application specification integrated circuits (ASICs). In another form, the spectrum analyzer unit 28 is implemented in software stored in memory 32 and executed by processor 30. There may be separate dedicated receive and transmit antennas, but for simplicity a single antenna is shown in FIG. 1.

The spectrum analyzer unit 28 receives the digital signals output by the ADC 24 and generates spectrum analysis data including characteristics of signal pulses (duration, center frequency, bandwidth, duty cycle, RSSI) etc., as well as raw I and Q samples of received signals for a period of time. The processor 30 executes interference classification process logic 60 encoded or stored in memory 32 to classify/identify and assign a type or name to any interference contained in received energy associated with the antenna-specific digital signals based on the spectrum analysis data output by the spectrum analyzer unit. For example, the spectrum analyzer unit 28 and interference classification process logic 60 may be implemented using the hardware and software capabilities found in the Cisco Spectrum Expert™ sensor devices or the CleanAir™ technology in the Cisco Aironet 3500 Series Access Point devices. In addition, other examples of the spectrum analyzer unit 38 and interference classification process logic 60 are described in U.S. Pat. Nos. 6,714,605; 7,254,191; 7,292,656; 6,850,735; 7,171,161; and 7,035,593. The processor 30 executes adaptive CCA threshold process logic 100 to adjust a CCA threshold when determining whether the AP is clear to send a transmission. In many AP designs, the CCA threshold is a software configurable parameter. It should be understood that the operations associated with one or both of the interference classification process logic 60 and adaptive CCA threshold process logic 100 may be implemented by the modem 26. There may also be stored in memory 32 a RSSI offset data 80 containing RSSI offsets used to produce different CCA threshold in the presence of different types of interferers.

The memory 32 is a memory device and may comprise read only memory (ROM), random access memory (RAM), magnetic disk storage media devices, optical storage media devices, flash memory devices, electrical, optical, or other physical/tangible memory storage devices. Thus, in general, the memory 32 may comprise one or more computer readable storage media (e.g., a memory device) encoded with software comprising computer executable instructions and when the software is executed (by the processor 30) it is operable to perform the operations described herein in connection with process logic 100.

Figure 3:
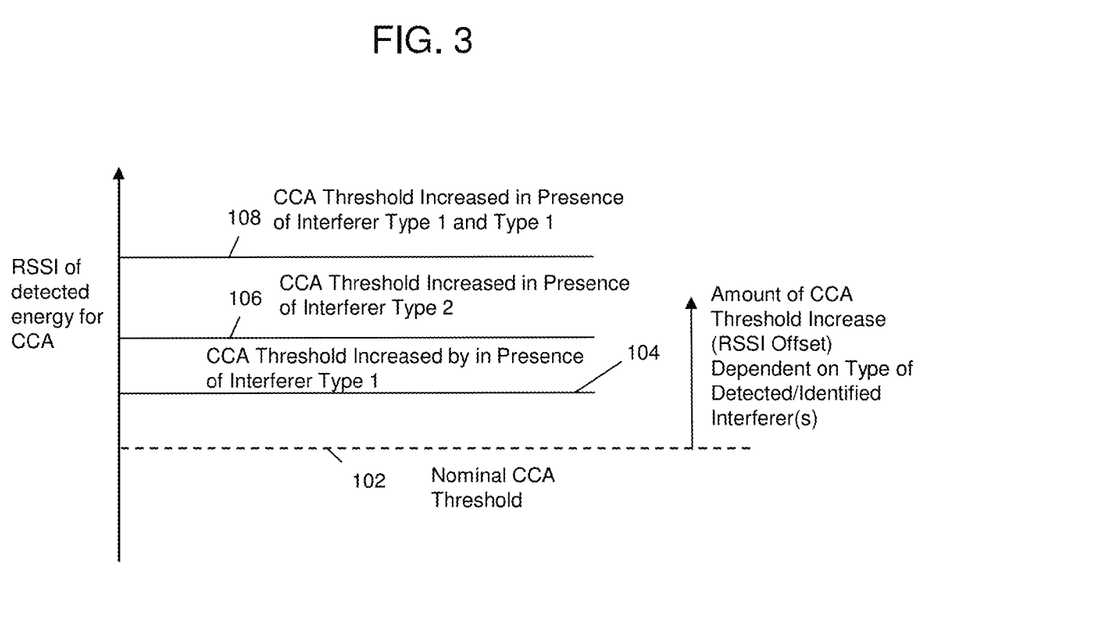
FIG. 3 is a diagram that generally depicts examples of adaptive adjustment of the clear channel assessment threshold based on the type(s) of detected interference.

Reference is now made to FIG. 3. FIG. 3 shows a plot of several CCA thresholds. As explained above, a CCA threshold is a power level, e.g., RSSI level, against which a power of detected energy is compared prior to initiating a transmission on a given channel. When the detected energy is less than the CCA threshold, this indicates that there is likely no other activity on the channel and therefore the AP can initiate a transmission. Conversely, when the detected energy is greater than the CCA threshold, this indicates that the detected energy is likely associated with another WiFi transmission and the AP or client should therefore backoff from transmitting for a period of time (after which it makes another CCA). Consequently, when the CCA threshold is raised or increased, this tends to make it easier for the detected energy to be less than the CCA threshold, and thus allow the AP or client to initiate a transmission.

A direct way to combat interference is to increase the CCA threshold of the WiFi network (at the AP and/or one or more clients) by an amount that depends on the type of the one or more detected interferers and their associated duty cycle on the channel. FIG. 3 shows a nominal CCA threshold at 102 used when no interference is present on the channel. An increased/adjusted CCA threshold is shown at 104 that is used, for example, when a particular interferer, referred to arbitrarily as a Type 1 interferer, is detected. Similarly, when a different type of interferer, referred to arbitrarily as a Type 2 interferer, is detected, the CCA threshold is increased even further as shown at 106. When two (or more) interferers are detected, then the CCA threshold can be still further increased as shown at 108 for, e.g., Type 1 and Type 2 interferers occurring simultaneously. By increasing the CCA threshold in the presence of an interferer by an amount, referred to herein as an RSSI offset, that depends on the type of interferer, instead of yielding access whenever an interferer is present, the WiFi device (AP or client) will still attempt to transmit even in the presence of the interference.

When transmitting in the presence of the interference the noise floor is elevated due to the energy from the interferer, and the WiFi device's transmissions may face a lower signal-to-noise ratio (SNR). However, with rate adaptation, the WiFi link will eventually settle to an appropriate probably lower coding rate and simpler modulation that is suitable for the current SNR level. Although a lower SNR can lead to more errors in the received packets, there are still packets correctly received. Therefore, instead of suffering zero throughput by not transmitting in the presence of the interferer due to the detected energy exceeding a CCA threshold, the techniques described herein allow the WiFi link to continue to operate even in difficult RF environments.

Stated equivalently, this method trades an increased packet error rate (PER) that results in a lower data rate versus an increased channel access time. By balancing between these two parameters in the computation of CCA threshold, a network can still maximize its throughput for a given noisy environment.

It is noted that the interferer's throughput can also suffer, as its SNR is also lowered due to the overlapping WiFi transmissions. However, the amount of degradation in performance experienced by the interferer can be managed by the degree of the CCA threshold increase. Moreover, certain devices, even though they may degrade WiFi throughput, may be running applications that are important for a user environment. To account for such possibilities, these techniques can allow for the storage of information in an AP indicating a listing of one or more interference types that should be respected (and thus not transmitted over), and in the presence of which, adjustment of the CCA threshold is milder or not be made. Or, the user can specify a maximum tolerance for non-WiFi devices' throughput to be affected. The adaptive CCA scheme would then operate within these configured limits. For example, for a listed interferer, information is stored indicating that the CCA threshold may not be raised beyond a particular interferer device's RSSI plus a protection margin, that is, up to a specific limit. Ultimately, varying degrees of coexistence is achieved with respect for interfering devices of importance to the user.

Again, the adaptive CCA threshold scheme described herein employs spectrum intelligence to determine an appropriate and accurate CCA threshold according to the type(s) of interferer(s) and associated duty cycle/RSSI. By identifying an interferer's type, it is possible to determine its associated RF signature (how much bandwidth it occupies, whether it hops to different frequencies, whether it continuously transmits, etc.) and thus determine its impact on a WiFi WLAN link. For example, a narrowband interference may be more detrimental to a transmission than a wideband interference. Once the type of the interferer is determined, the throughput of the WLAN link that results when co-existing with that interferer can be determined, and therefore the impact of raising the CCA threshold (which will result in lower SNR due to the coexistence that will occur) can be determined in order to assess whether it is worthwhile to raise the CCA threshold. Thus, the projected throughput may be based on at least one of: the type of the interference and a radio frequency signature of the interference.

Moreover, the interferer may not be "on" all the time (i.e., continuously), i.e., the duty cycle of the interferer is also relevant. When an interfering device is transmitting continuously, i.e., it has a duty cycle of 100%, its interference will be much more detrimental to another device that is transmitting only intermittently, say at a duty cycle of 40%. In this case, the projected throughput of a WLAN link in the presence of an interferer with a 100% duty cycle will be lower than in the presence of an interferer with a 40% duty cycle. Thus, the duty cycle and the interferer type together affect the projected throughput impact on a WLAN link.

In general, due to the operation of CSMA, the raised CCA threshold needs to be equal to or completely above the interferer's receive signal strength in order for the AP to transmit over the interferer and coexist with it. However, an interferer may not be transmitting with a fixed power all the time. By identifying those transmissions originating from each such interferer, it is possible to determine receive signal strength statistics indicating that the RSSI of an interferer is higher during certain time intervals than during other time intervals. A CCA threshold can then be selected that does not need to be above or equal to this interferer's peak receive signal strength but rather the CCA threshold could be adjusted to a value somewhere between the higher/peak RSSI and the other RSSI level of the interferer, that is, lower than the higher/peak RSSI. As a result, the WLAN devices will not be always transmitting over the interferer, but rather only during times when the interferer has a lower RSSI at the AP. In this way, the AP will yield to or respect this interferer at certain time intervals and WLAN transmissions are made over the interference during other time intervals. A network administrator may set a policy that specifies certain privileges to permit coexistence for a certain type of interferer. For example, assume that the receive signal strength at an AP for an interferer ranges from −45 to −55 dBm and at a duty cycle of 60% and 40%, respectively. In this example, an AP in the WLAN may set the CCA threshold to −50 dBm and consequently share the channel with 40% of this interferer's transmissions. If the CCA threshold is set to more than −45 dBm, then the AP is sharing with 100% of the interferer's transmissions. By accurately distinguishing the make-up of the interference, it is possible to account for RSSI contributed from neighboring WiFi APs. This is useful because, for the neighboring APs, it is desirable not to create excess co-/adjacent-channel interferences or coverage holes.

The following are other examples that illustrate why interferer identification is important for CCA threshold adjustment. A Bluetooth™ (BT) device uses a frequency hopping pattern; thus, it has a relatively low duty cycle at each frequency. As a result, its interference can have a milder impact to WLAN throughput than a persistent video camera, which has a wider bandwidth signature and high duty cycle. As another example of an interferer is a Digital Enhanced Cordless Telecommunications (DECT) cordless phone. A DECT phone usually has a narrower bandwidth signature and lower duty cycle than a video camera that may cause potentially lesser negative impact to throughput of a WiFi network than a video camera. However, the effects of a DECT phone on a WiFi network may be worse than that from a BT device, since the former typically has a higher duty cycle than the latter at each frequency. Therefore, when calculating the improvements produced by a CCA threshold increase, it is more effective when the adjustment of the CCA threshold is based on the specific type of interferer device detected. For instance, a RSSI offset per interference device type can be added when estimating the packet error rate (PER) impact in the throughput calculations. In the example above, the BT device may have an RSSI offset smaller than that for the DECT phone, which itself may have an offset smaller than that for the video camera. These offsets can be evaluated and determined for the system to use beforehand or at runtime. Thus, the CCA threshold is adjusted by an amount that depends on the impact that a given type of interference has on the wireless network.

Moreover, it is possible that more than one type of interferer is present. By determining the types of devices making up the interference, the appropriate CCA threshold increase can be determined for that unique environment. For example, when it is determined that these interferers transmit at different time intervals, the CCA threshold can be increased to a certain value specifically to allow sharing the channel with one group of interferers while deferring completely for another group of interferers. In other words, the CCA threshold is increased by an amount that is specific to a particular subset of the multiple types of interference.

Using the identity of interferers to adjust the CCA threshold provides for a significant advantage over methods that are based solely on the measured RSSI and duty cycle of the interference, clients and nearby APs. The measured RSSI and duty cycle of interference alone cannot accurately reflect the true spectral nature of the interference and "blindly" raising the CCA threshold may not suffice. For example, depending on how noise is averaged across a channel, narrowband and wideband interferences may be reported with the same RSSI measurement on WiFi chipsets; however, the effects of the two types of interference on WiFi throughput can be quite different. For an equal amount of signal energy, the former can be much less detrimental than the latter. If an attempt to raise the CCA threshold is based on RSSI for wideband interference, there may be no improvement in the WiFi link. This can lead to inefficiencies such as waste of transmit energy, reduced throughput from longer backoff times, dropping of client links, and degrading other users' operation in the frequency band without improving the WiFi network. On the other hand, a system that can identify the interference can intelligently decide that there is no benefit to attempt a CCA threshold increase when the interferer is, for example, a wideband video camera having a relatively high RSSI.

The foregoing description thus has focused only on the downlink and in which the CCA threshold at the AP is modified. These adaptive CCA threshold techniques can be applied in the uplink as well, and in the entire Basic Service Set (BSS), when a mechanism to set the clients' CCA threshold is supported. For example, certain client devices can be commanded by the AP to use a particular CCA threshold. When the client CCA threshold is increased, the AP also commands the clients not to associate with an AP whose beacons have an RSSI above the new CCA threshold by a certain sufficient margin. This CCA threshold and related information can be communicated by the AP to clients in a particular sub-element of a beacon.

In general, the techniques described herein involve a first wireless device configured to wirelessly communicate with one or more second wireless devices in a wireless network in a frequency band. The first wireless device receives energy on a channel in the frequency band. The first wireless device analyzes received energy to detect interference on the channel, and determines a type of interference detected in the received energy. A CCA threshold used by the first wireless device and/or second wireless device when accessing the channel is adjusted by an amount depending on the type of interference detected.

Figure 4A:
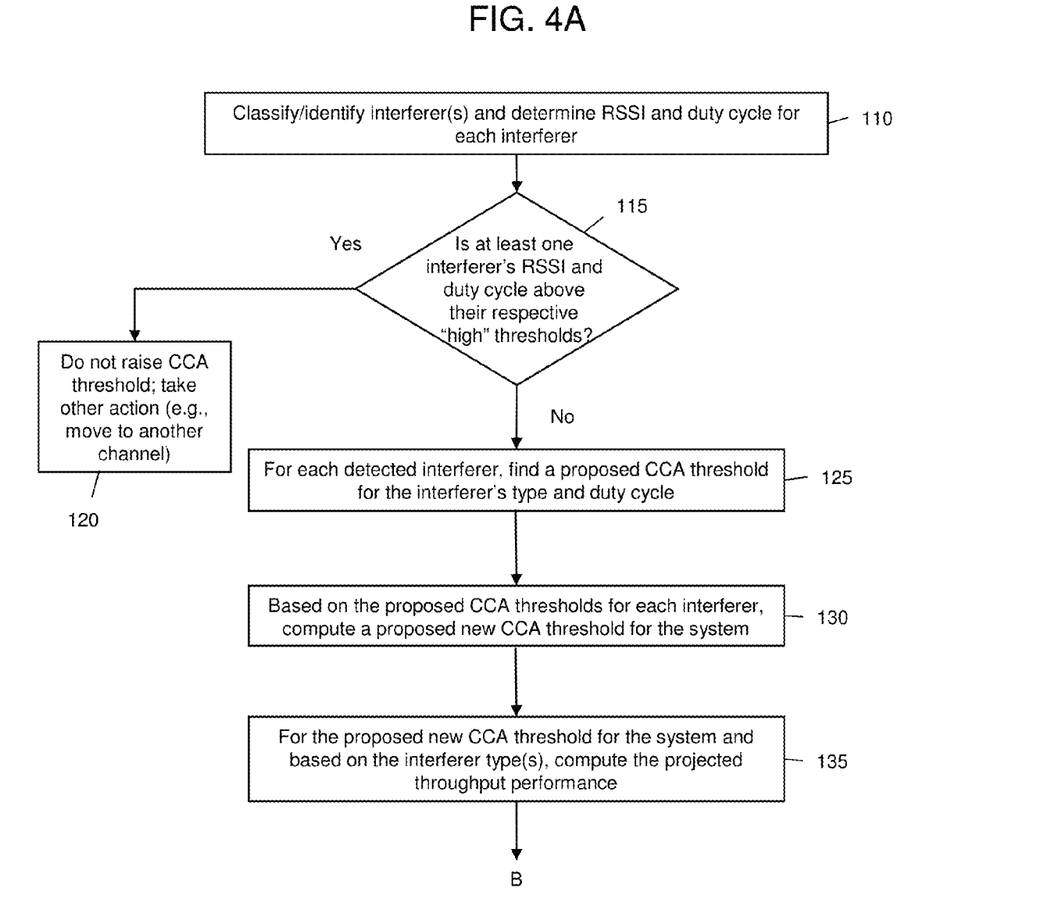
FIGS. 4A and 4B illustrate an example of a flow chart for operations performed in a wireless access point to adaptively adjust a clear channel assessment threshold based on the type(s) of detected interference.
Figure 4B:
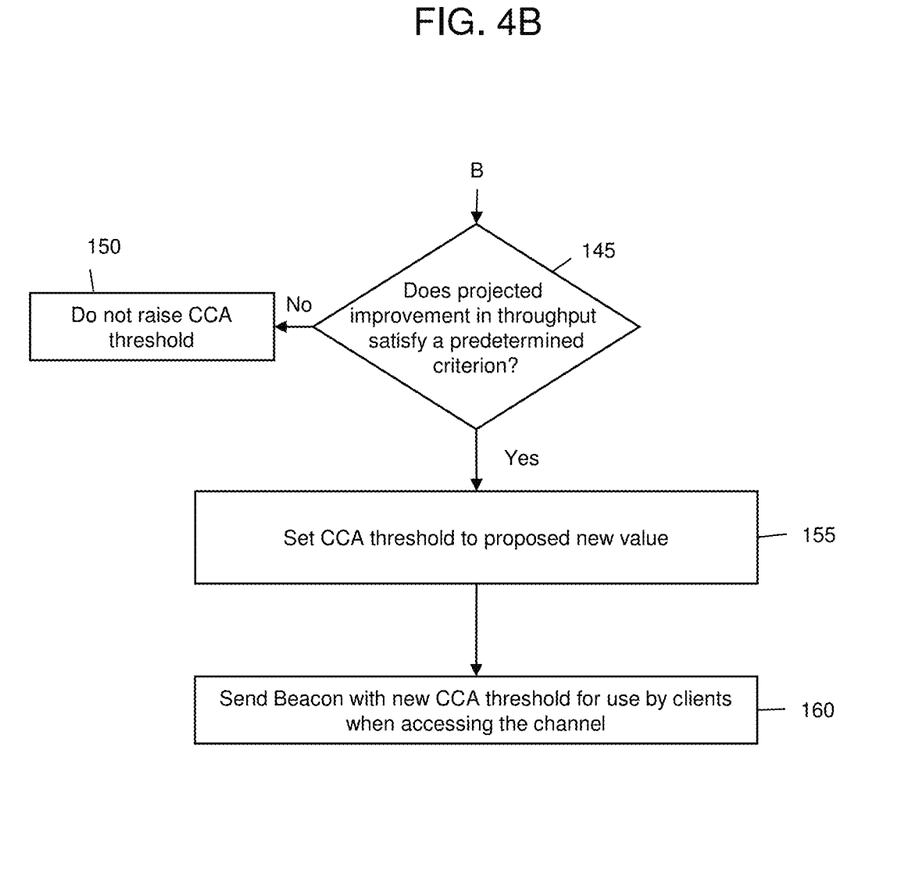

Reference is now made to FIGS. 4A and 4B for a description of the operations of the process logic 100. At 110, the AP identifies/classifies each detected interferer by type and determines its RSSI and duty cycle. As explained above, the duty cycle of an interferer may be determined from monitoring the behavior of the interferer and/or from a priori knowledge of the duty cycle known for a particular type of interferer. In one form, an incremental amount is added to the duty cycle for an interferer, a so-called "hang time" to allow/assume that the interferer continues to be on. This "hang time" adjustment to the duty cycle for an interferer is useful due to the nature of the CSMA protocol, where a signal propagation time needs to be accounted for before declaring that the channel is "idle". For example, in 802.11, a minimum duration of Distributed Interframe Space (DIFS) is required before considering the channel idle. Similarly, a small margin may be added to the RSSI for an interferer to account for inaccurate RSSI measurements, which often are subject to channel fluctuations.

At 115, the RSSI of the one or more detected interferers is compared to a threshold (called a "high" threshold). If the interference RSSI is above this threshold, adjusting the CCA threshold will not result in any improved performance (because the interference is too strong). Thus, at 120, the CCA adjustment scheme is aborted/exited. Instead of adjusting the CCA threshold, the AP may switch to another channel. At 125, from a table stored in the AP, e.g., table 80 shown in FIG. 2, the RSSI offset is determined for the interferer types detected at 110 and this RSSI offset and duty cycle is used to produce a corresponding new proposed CCA threshold that is used for throughput calculations prior to ultimately deciding to use that CCA threshold. At 130, based on the new proposed CCA thresholds determined individually for each interferer, a proposed new CCA threshold is determined taking into account the presence of multiple interferers if multiple interferers are detected. In other words, when multiple interferers are detected, the proposed RSSI for their aggregated effect is determined at 130 in computing an overall proposed new CCA for the overall system taking into account the proposed new CCA threshold for the individual interferers. At 135, for the proposed new CCA threshold for the system computed at 130, and based on the interferer type(s) and/or duty cycle, a projected throughput performance is computed.

After the proposed new CCA threshold is determined (raised to or above the interferer's RSSI), the resulting receive SNR at an intended receiving device (with respect to the AP) can be estimated. For a given SNR, it is possible to determine the packet error rate (PER) specific to a coding rate or modulation scheme. This PER can further factor in effects from the type of interference. For example, a narrowband interference can wipe out a few subcarriers making it more difficult to recover the packet. Thus, the PER in the presence of a narrowband interferer will be higher. Once the PER is computed, this can be used to calculate the throughput of the link. Thus, the projected throughput improvement takes into account the type of interference detected, as well as the duty cycle and RSSI of the interference. In computing the throughput, an evaluation may be made of the increased percentage of channel time expected to be available for the AP assuming a commensurate degradation in SNR in order to project the new rate the AP may select for existing clients. Furthermore, most of the coverage area of an AP would be remote (e.g., on the other side) from the interference, and therefore most of the clients would have a lower RSSI from the interference. Those clients that are remote from the interferer would not suffer as much from the interference and a biasing factor may be applied to account for the varying impact of the interference on clients.

Turning to FIG. 4B, at 145, it is determined whether the projected throughput resulting from a change in the CCA threshold to the proposed CCA threshold satisfies at least one predetermined criterion. The predetermined criterion is, for example, a certain minimum throughput improvement value. If not, the CCA threshold adjustment plan is aborted at 150 and other actions should be taken (such as changing channels, etc.). In other words, the CCA threshold is not increased when the throughput improvement does not satisfy the predetermined criterion. However, if the projected throughput improvement satisfies the predetermined criterion, then at 155, the AP sets its CCA threshold to the proposed new CCA threshold. (As explained hereinafter, the proposed new CCA threshold may be used at the AP and/or one or more clients.) When there are several types of interferers occurring, it is determined whether the projected throughput for any one of the combinations of types of interference satisfies the predetermined criterion, and the AP selects one of the CCA threshold values computed for the combination of interferers that results in the best throughput improvement.

At 160, an additional and optional operation is performed when the clients are capable of being configured/commanded by the AP to use a particular CCA threshold. The AP sends a message, e.g., a beacon, having information contained in a field that indicates a new CCA threshold for use by its clients when the clients access the channel for uplink transmissions to the AP.

In summary, the techniques described herein combat interference by raising the CCA threshold with an amount appropriate to the identified interference type, so that the WiFi network can operate at better throughput. The techniques described herein involve use of the identity of the type of interference to recommend whether adapting the CCA threshold is feasible or not, and if so, to determine the CCA threshold value appropriate for the specific type of detected interference. The purpose of raising the CCA threshold is to increase the percentage of time that the channel is available for downlink transmission from the AP. While some clients may not effectively benefit from this due to their close distance to the interferer(s), there will likely be other clients that do benefit. These techniques will enhance the downlink transmission when interferers are in close RF proximity to the AP.

The projected throughput when coexisting with the interferer(s) can be computed based on the types of interference and associated RSSI. The interfering devices operating on the channel are then forced to coexist with the WiFi network (operating with the adjusted CCA threshold) by "sharing the energy space" instead of the usual exclusivity to a channel by time-sharing. The adaptive CCA threshold techniques described herein are not limited to IEEE 802.11 (WiFi) networks, and even in the case of WiFi networks these techniques are not limited to interference from non-WiFi devices as they are also useful for improving coexistence with co-channel and adjacent channel WiFi interference.

A more sophisticated approach involves using location information of each client and the interferer(s) and an expected RSSI for each client. For example, in existing WLAN systems, the locations of each client and of the interferer(s) can be determined and displayed to a network administrator. Therefore, it is possible to determine the location of an interferer and any clients in the vicinity of the interferer. Using this information and a path loss model, it is possible to estimate the RSSI of the interferer as seen by the client. A CCA threshold value can be determined that is specific to a client based on its relative location to the interferer(s). The AP can communicate this CCA threshold value to the client as explained above in connection with operation 160 in FIG. 4B. In other words, a CCA threshold is determined that is specific to a particular STA based on the location of the particular STA relative to a location of a source of detected interference. The AP transmits to the particular STA a message containing information indicating the CCA threshold to be used by the particular STA when transmitting to the AP. This allows the client to adjust its CCA threshold used when sending uplink transmissions.

When location information for a client and/or interferer is not available, the projected throughput computed for a given CCA threshold adjustment is the overall expected throughput of the network (all clients associated with an AP) in the presence of the interferer(s) assuming that the clients are evenly distributed across the coverage area of the AP.

Similarly, the downlink can be improved by computing the specific power level for the AP to transmit to a particular client based on the client's relative location to the interferer(s). For example, after computing the RSSI of the interferer at the client (as explained above), the AP computes an amount of transmit power to be increased in order to transmit to the client for a target PER at the client's receive SNR, or likewise for a transmit power used by the client device when transmitted to the AP. This amount of transmit power increase can be computed to be proportional to the CCA threshold offset that has been determined for that client. In even more aggressive approaches, the AP may adjust its transmit power on a per packet basis to match the intended recipient client devices.

The above description is intended by way of example only. Various modifications and structural changes may be made therein without departing from the scope of the concepts described herein and within the scope and range of equivalents of the claims.

What is claimed is:

1. A method comprising:
   at a first wireless device that is configured to wirelessly communicate with one or more second wireless devices in a wireless network in a frequency band, receiving energy on a channel in the frequency band;
   analyzing received energy to detect interference on the channel, including two or more interferers in the frequency band;
   determining a type, a receive signal strength, and a duty cycle for each of the two or more interferers;
   adjusting a clear channel assessment threshold used when accessing the channel by an amount depending on the type of interference detected, the adjusting including:
      determining a proposed new channel assessment threshold individually for each interferer; and
      determining an overall clear channel assessment threshold from the proposed new channel assessment thresholds for the individual interferers;
   computing a projected throughput improvement based on the overall clear channel assessment threshold; and
   using the proposed new clear channel assessment threshold at the first wireless device and/or one or more second wireless devices.

2. The method of claim 1, wherein the using further comprises using the proposed new clear channel assessment threshold at the first wireless device and/or second wireless device when the projected throughput improvement satisfies the predetermined criterion.

3. The method of claim 2, wherein computing the projected throughput improvement is based on at least one of: the type of the interference and a radio frequency signature of the interference.

4. The method of claim 3, wherein computing the projected throughput improvement is based further on a duty cycle of the interference.

5. The method of claim 4, wherein computing the projected throughput improvement is based further on receive signal strength statistics that indicate that the receive signal strength associated with the interference is higher during certain time intervals than during other time intervals.

6. The method of claim 2, wherein adjusting comprises not increasing the clear channel assessment threshold when the projected throughput improvement does not satisfy the predetermined criterion.

7. The method of claim 1, and further comprising generating receive signal strength statistics that indicate that the receive signal strength associated with the interference is higher during certain time intervals than during other time intervals, and wherein adjusting comprises adjusting the clear channel assessment threshold to a value that is lower than the higher receive signal strength of the interference so that during some time intervals the interference is respected and during other time intervals a transmission is made over the interference.

8. The method of claim 1, and further comprising transmitting from the first wireless device to one or more of the second wireless devices a message containing information indicating a new clear channel threshold to be used by one or more of the second wireless devices when transmitting to the first wireless device.

9. The method of claim 1, and further comprising storing information at the first wireless device indicating one or more types of interferers in the presence of which adjustment of the clear channel assessment threshold is not made or is made up to a specific limit.

10. The method of claim 1, wherein adjusting comprises adjusting the clear channel assessment threshold by an amount that depends on the impact that the type of interference has on the wireless network.

11. The method of claim 1, and further comprising determining a clear channel assessment threshold that is specific to a particular second wireless device based on a location of the particular second wireless device relative to a location of a source of detected interference, and transmitting from the first wireless device to the particular second wireless device a message containing information indicating the clear channel assessment threshold to be used by the particular second wireless device when transmitting to the first wireless client device.

12. The method of claim 11, and further comprising computing a transmit power level to be used by the first wireless device when transmitting to the particular second wireless device or by the particular second wireless device when transmitting to the first wireless device based on a location of the particular second wireless device relative to the location of the source of the interference.

13. An apparatus comprising:
a radio receiver configured to downconvert received energy in a channel in a frequency band allocated for wireless communication in a wireless network;
a processor configured to:
analyze signals output by the radio receiver to detect interference on the channel, including two or more interferers in the frequency band;
determine a type, a receive signal strength, and a duty cycle for each of the two or more interferers;
adjust a clear channel assessment threshold used when accessing the channel by an amount depending on the type of interference by determining a proposed new clear channel assessment threshold individually for each interferer;
determine an overall clear channel assessment threshold from the proposed new channel assessment thresholds for the individual interferers; and
compute a projected throughput improvement based on the overall clear channel assessment threshold.

14. The apparatus of claim 13, and further comprising a spectrum analyzer unit coupled to the radio receiver and configured to analyze the received energy, and wherein the processor is configured to analyze data output by the spectrum analyzer unit in order to determine the type of interference detected in the received energy.

15. The apparatus of claim 14, wherein the processor is configured to compute the projected throughput improvement based on the type of the interference.

16. The apparatus of claim 15, wherein the processor is configured to compute the projected throughput improvement based further on a duty cycle of the interference.

17. The apparatus of claim 16, wherein the processor is configured to compute the projected throughput improvement based further on receive signal strength statistics that indicate that the receive signal strength associated with the interference is higher during certain time intervals than during other time intervals.

18. The apparatus of claim 13, wherein the processor is configured to generate receive signal strength statistics that indicate that the receive signal strength associated with the interference is higher during certain time intervals than during other time intervals, and to adjust the clear channel assessment threshold to a value that is lower than the higher receive signal strength of the interference so that during some time intervals the interference is respected and during other time intervals a transmission is made over the interference.

19. One or more computer readable storage media encoded with software comprising computer executable instructions and when the software is executed operable to:
analyze signals output by a radio receiver to detect interference on a channel in a radio frequency band, including two or more interferers in the frequency band;
determine a type, a receive signal strength, and a duty cycle for each of the two or more interferers;
adjust a clear channel assessment threshold by an amount depending on the type of interference when a wireless device accesses the channel in a wireless network operating on the channel in the radio frequency band by determining a proposed new clear channel assessment threshold individually for each interferer;
determine an overall clear channel assessment threshold from the proposed new channel assessment thresholds for the individual interferers; and
compute a projected throughput improvement based on the overall clear channel assessment threshold.

20. The computer readable storage media of claim 19, and further comprising instructions configured to determine whether the projected throughput improvement satisfies at least one predetermined criterion, and use the proposed new clear channel assessment threshold when the projected throughput improvement satisfies the predetermined criterion.

21. The computer readable storage media of claim 20, wherein the instructions that are operable to determine the proposed new clear channel assessment threshold comprise instructions operable to determine the proposed new clear channel assessment threshold based on the type, duty cycle and receive signal strength of the interference.

22. The computer readable storage media of claim 19, and further comprising instructions operable to generate receive signal strength statistics that indicate that the receive signal strength associated with the interference is higher during certain time intervals than during other time intervals, and the instructions that are operable to adjust comprise instructions operable to adjust the clear channel assessment threshold to a value that is lower than the higher receive signal strength of the interference so that during some time intervals the interference is respected and during other time intervals a transmission is made over the interference.

* * * * *